March 31, 1931.  G. JOHNSON  1,798,796
SEPARABLE FASTENER
Filed June 28, 1928
Fig. 1.
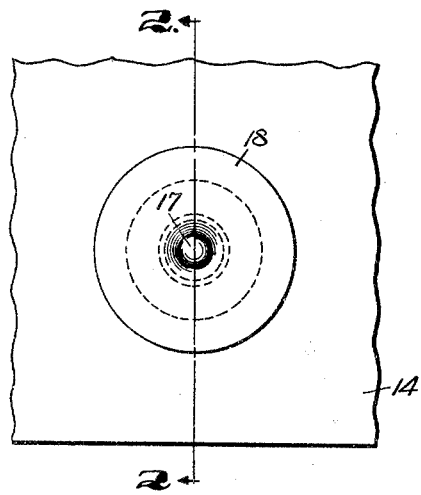
Fig. 2.
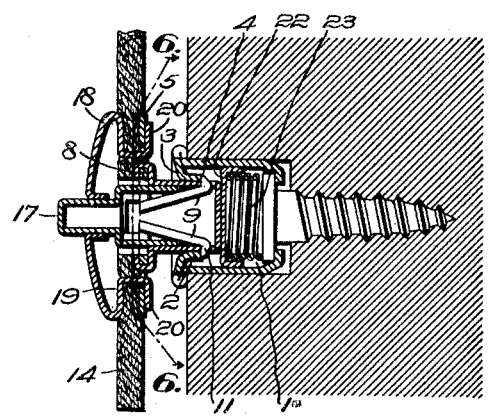
Fig. 6.
Fig. 3.
Fig. 7.
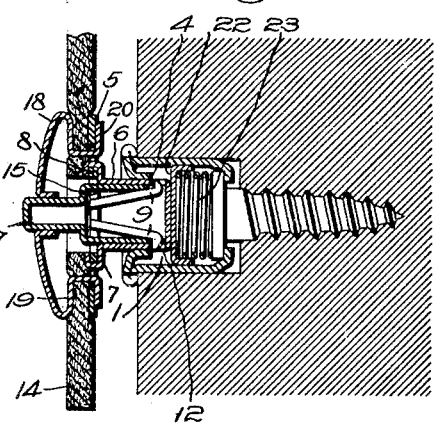
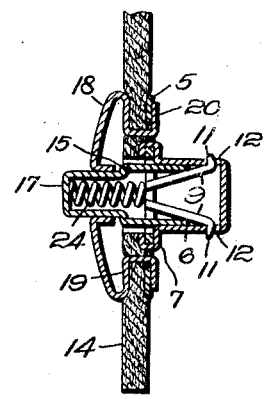
Fig. 4.
Fig. 5.
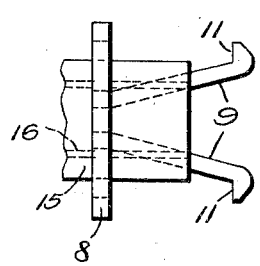
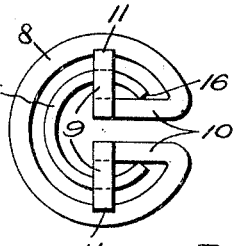
Inventor:
Gustav Johnson
by Emery, Booth, Janney & Varney
Att'ys Patented Mar. 31, 1931

1,798,796

UNITED STATES PATENT OFFICE

GUSTAV JOHNSON, OF WEST ROXBURY, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed June 28, 1928. Serial No. 289,040

My invention aims to provide improvements in separable fasteners.

Referring to the preferred embodiment of my invention, as illustrated by the drawings:—

Figure 1 is a front elevation of the fastener assembly;

Fig. 2 is a section taken on the line 2—2 of Figure 1 with parts of the fastener assembly being shown in elevation;

Fig. 3 is a section similar to that shown in Fig. 2 but showing the relation of the parts with the press-button moved inwardly to disconnect the jaw means from the socket prior to separation of the fastener;

Fig. 4 is an enlarged detail view showing in elevation the one-piece jaw-presenting element and a portion of the axially movable member;

Fig. 5 is an end elevation of the parts shown in Fig. 4;

Fig. 6 is a section taken on the line 6—6 of Fig. 2; and

Fig. 7 is a section of a stud member similar to that shown in Figs. 2 and 3 but showing an additional spring inserted between the press-button member and the base of the jaw-presenting element.

Referring to the embodiment of my invention illustrated by the drawings, I have shown a combination stud and socket fastener which is preferably of the so-called "flush type", particularly, though not exclusively, adapted for securing a flexible medium to a rigid medium.

The socket 1, which I have illustrated in Figs. 2 and 3, is substantially the same as that shown and described in the United States Letters Patent No. 1,625,406 issued to Andrew G. Anderson April 19, 1927. My socket member is provided with a relatively wide wall 2 at the stud-receiving aperture 3 and the wall terminates abruptly to provide an annular shoulder 4, the purposes of which will hereafter more fully appear.

The stud assembly is of the "latch type" and its construction and the arrangement of parts have been carefully considered with a view to simplifying this type of stud thereby securing an inexpensive highly desirable fastener. Therefore, I have provided a plate portion 5 having a hollow boss portion 6 extending therefrom to provide a socket-engaging projection. A depression 7 is formed in the plate portion 5 and into this is placed the base-like portion 8 of a latch-presenting socket-engaging element. This element has a pair of diverging arms 9 connected to the base-like portion 8 by means of the connecting portions 10 and each arm is provided at its free end with a latch or jaw portion 11. The jaw portions 11 pass through openings 12 in the side wall of the boss portion 6 and are thereby adapted to engage behind the shoulder 4 of the socket 1, as shown in Fig. 2.

The latch-presenting element is preferably formed from a single piece of wire (Figs. 4 and 5) which is rectangular in cross-section and is held in assembled relation to the plate portion 5 by means of ears 13 pressed from the plate portion 5 and bent over the base-like portion 8, as best shown in Figs. 2 and 6.

In assembling the parts of the stud assembly with the flexible carrying medium 14, I next provide an axially movable element 15 which is open at one end and has a slot 16 at one side to permit the open end to pass through the C-shaped opening in the base-like portion 8 of the latch-presenting element for engagement with the arms 9. The slot 16 is provided to permit the axially movable element 15 to pass by the connecting portions 10, as best illustrated in Fig. 6. The axially movable element 15 may be reciprocated or operated in any suitable manner and by any suitable means and, therefore, while I have shown a press-button portion 17 formed integral therewith I do not wish to be limited to that particular structure and means of operation of the fastener.

Assuming that the latch-presenting element and axially movable element are assembled with the socket-engaging element, which presents the boss portion 6, the plate portion 5 is placed against the inner face of the flexible carrying medium 14 and an attaching part 18 is placed against the outer face of the carrying medium, as shown in Figs. 2 and 3. The attaching part has an inwardly turned flange 19 from which extend a number of prongs 20. These prongs pass through the carrying medium, through holes 21 (Figs. 3 and 6) (formed in the plate 5 by the material cut out to provide the ears 13) and are bent against the plate portion 5. Any other simple means of attachment may be substituted for the one described. When the stud elements are completely assembled the press-button portion is exposed through an opening in the attaching part 18, as illustrated in Figs. 2 and 3.

When the stud and socket are engaged, as shown in Fig. 2, the closure plate 22, in the socket, is forced away from the shoulder 4 against the pressure of the spring 23 by the boss portion 6 and the jaw portions 11 engage the shoulder 4 and lock the stud and socket against accidental separation. The boss portion 5 cooperates with the wall 2 of the socket thereby preventing tipping of the stud relative to the socket.

To disengage the fastener members it is merely necessary to press upon the exposed end of the press-button portion 17. This action moves the axially movable element 15 toward the jaws 11 thereby engaging the arms and squeezing them together to draw the jaws 11 into the boss portion 5, as illustrated in Fig. 3. When the operator releases his finger the spring 23 in the socket will urge the closure plate 22 toward the stud-receiving aperture 3 thereby ejecting the boss from the aperture.

The press-button and the axially movable portion will be forced into their normal positions by the arms 9 which are yieldable and normally spring away from each other and expose the jaws 11 at the outer face of the side wall of the boss portion 5.

In Fig. 7, I have illustrated a stud member of the type and construction above described, in connection with Figs. 1 through 6, with the addition of a spring 24 interposed between the press-button portion 17 and the base-like portion 8 of the latch-presenting socket-engaging element. This spring may be added whenever it is necessary to assist in returning the press-button to its normal position.

While I have illustrated and described preferred embodiments of my invention I do not wish to be limited thereby as the scope of my invention is best defined by the following claims.

Claims:

1. A fastener stud assembly having a socket-engaging boss portion 6 provided with an opening 12 in its side wall, a plate portion 5 from which said boss portion 6 extends, latch-presenting means assembled with the plate portion 5 and comprising a base-like portion 8 having a C-shaped opening therethrough, an arm 9 extending from said base-like portion 8, said arm having a latch portion 11 at its free end extending through the opening 12 in the boss portion 6, a connecting member 10 securing the arm 9 to the base-like portion 8, and an axially movable tubular member 15 forming a part of the stud assembly, said tubular member 15 having a press button portion 17 and an unlocking portion, said unlocking portion being open at one end and having a single slot 16 beginning at the open end thereof and extending along a portion of the entire length of the side wall thereof whereby said tubular member 15 may be assembled with the boss portion and the latch-presenting means by direct axial movement relative thereto, the unlocking portion of said axially movable member 15 passing through the C-shaped opening in the base-like portion and the connecting member 10 passing through the slot 16, as and for the purposes illustrated and described.

2. A fastener stud installation comprising, in combination, a socket-engaging boss-presenting member having a base flange and having a slot in the side wall of the boss, latch-presenting means having a base seated against the base flange of the boss-presenting member, means formed integral with the base flange and extending over the base of the latch-presenting means whereby the latch-presenting means is held in positive assembled relation with the boss-presenting member, an arm extending from the base of the latch-presenting member into the boss and a latch extending from the free end of the arm through the slot in the boss to lock the stud with a socket, an axially movable element assembled within the boss and adapted to engage the said arm to draw the latch into the boss and permit separation of the stud from a socket, a flexible carrying medium, against one side of which the base of the latch-presenting means is located, an attaching plate located at the opposite side of the carrying medium and attaching means extending from one of the stud parts through the carrying medium and engaging another of the stud parts to secure the parts of the stud in fixed relation to the carrying medium.

In testimony whereof, I have signed my name to this specification.

GUSTAV JOHNSON.